United States Patent Office 3,705,937
Patented Dec. 12, 1972

3,705,937
PRODUCING DIAMONDS SYNTHETICALLY
Boris Eduardovich Dzevitsky, Tsentralny proezd 9, kv. 8, Krasnogorsk Moskovskoi Oblasti, U.S.S.R.; and Boris Vladimirovich Spitsyn, ulitsa Vavilova 37a, kv. 54; Dmitry Alexandrovich Kochkin, ulitsa Dmitria Ulyanova 4/34, korpus A, kv. 33; and Boris Vladimirovich Deryagin, ulitsa Vavilova 37a, kv. 47, all of Moscow, U.S.S.R.
No Drawing. Filed May 1, 1970, Ser. No. 33,919
Int. Cl. C01b 31/06
U.S. Cl. 423—446                4 Claims

ABSTRACT OF THE DISCLOSURE

The invention relates to methods of producing diamond synthetically with the use of seed crystals.

According to the invention, the method of synthesizing diamond consists in contacting diamond seed crystals with an organometal compound containing at least one easily broken metal carbon bond, and is carried out at a temperature selected from the range of 300 to 1800° K. and at the resulting partial pressure of said organometal compound.

---

The present invention relates to producing diamond synthetically. More particularly, the invention relates to a method of growing diamond on diamond seed crystals.

The invention may be employed for increasing the size and mass of commercial diamond dust, and also for increasing the size of large crystals. Moreover, the present invention may be used for producing diamond films with predetermined properties to be employed in the microradioelectronics and instrument-making industry.

A method, according to which diamond is deposited on seed crystals under metastable conditions, has been developed by W. G. Eversole (U.S. Pat. No. 3,030,188). The object of the invention of W. G. Eversole was to provide a gas-solid contact process for producing diamond synthetically.

According to said patent, carbon-containing gas is passed over diamond seed crystals under proper conditions for growth of diamond on such seed crystals. Generally the method of Eversole resides in contacting diamond seed crystal with a gas which at least partially decomposes to a free methyl radical, in the temperature range from about 600° C. to about 1600° C. and at pressures when the partial pressure of said methyl group-containing gas is less than 75 mm. Hg.

Carbon is deposited as diamond on the seed crystals in spite of the fact that graphite under said conditions is the thermodynamically stable form of carbon. If the period of deposition is prolonged, black carbon in the form of graphite begins to interfere with the diamond growth process. The process as disclosed in said patent teaches as the source carbon of organic compounds noted for their high bond strength, namely methane, ethane, propane, acetone, methyl chloride, and methyl mercaptan.

Therefore the practically acceptable rate of the diamond growth is attained with the process being carried out at high temperatures (above 900° C.).

The process of the diamond growth is accompanied by pyrolysis of said compound at high temperatures, which results in the deposition of graphite due to the intermediate formation of compounds with multiple bonds (ethylene, acetylene). Therefore, for the process to be continued, it is necessary that graphite should be periodically removed from the seed crystals.

It is an object of the present invention to provide a method for producing diamond synthetically by growing diamond on seed crystals at lower temperatures, at a higher rate and under conditions which would prevent the formation of graphite.

Said object is accomplished through the synthesis of diamond by growing it on seed crystals, the synthesis, according to the invention, residing in contacting diamond seed crystals with an organometal compound containing at least one easily splitting metal-carbon bond, the process being carried out in the temperature range from about 300° K. to about 1800° K. and at pressures from $10^{-6}$ to 10 bar.

As organometal compounds it is recommended to use compounds belonging to lower alkyl derivatives of elements belonging to Groups I–V of Periodic System, such as tetraethyl lead, dimethyl mercury, tetramethyl lead. The best conditions for carrying out the process is the temperature range within 700–1400° K., and a pressure range, $10^{-4}$–$10^{-2}$ bar. Under said conditions the growth rate is attained to be from several decimal fractions of percent to several percent per hour, without side reactions taking place to any noticeable extent, and the process of growing diamond on seed crystals is carried out in simple equipment.

Practically the present method is effected as follows. Diamond seed crystals in a silica "boat" are placed into a silica reactor made as a tube, with the starting organometal compound being fed from one end of the tube and the reaction products existing from the other end of the tube for evacuation, said other end of the tube being connected to a high-vacuum system via traps. The reactor is heated by a resistance furnace. The temperature in the diamond growth zone is controlled by a thermocouple. The concentration of the organometal compound employed in a gas used for the synthesis process is fixed by setting the temperature and pressure in the evaporator in accordance with the vapor pressure of the substance. The time of one experiment on the synthesis of diamond is from 0.5 hr. to 8 hrs. The process can be effected either with pure vapours of an organometal compound, or with such vapours being diluted with an inert gas medium, such as helium, argon and the like.

The mechanism of the process is as follows:

The initial organometal compound decomposes with breakage of the most easily breakable metal-carbon bond. The forming free-lower alkyl-radical recombines with a free valence on the surface of a seed crystal, forming a new carbon-carbon bond. The free-radicals of the phase eliminate hydrogen atoms from the radical attached to the surface. This process requires an activation energy of the order of 7–10 cal./mole and is a factor limiting the kinetics as a whole. In the course of elimination of hydrogen atoms contained in the radical adsorbed on the surface, new carbon-carbon bonds of diamond type are formed (with neighbouring free valences on the surface of diamond). As a result, the carbon crystal grows with the diamond structure being preserved. The rate of the process is determined by the concentration of free-radicals in the volume, which by many orders of magnitude exceeds the concentration attained in the experiments made by W. G. Eversole, and the equilibrium one.

For illustration, given hereinbelow is a schematic diagram of the stages of the process of interaction of the free valence on the surface of diamond $C_a$, with the organometal compound E—R (E signifying a metal together with other ligands attached thereto):

$E-R \rightarrow E + R°$ (breakage)
$C_a· + R° \rightarrow C_a-R$ (recombination)
$C_a-R + R° \rightarrow C_a-C_x^x + · + RH$ (elimination of hydrogen)

As can be seen from the description, the present invention makes is possible to synthesize diamond both at low temperatures (about 700° K.), and at temperatures up to about 1300° K., in the latter case the growth rate still being more than twice as high as that attained in the Eversole process. In the range of low temperature, the growth rate in the process of the present invention exceeds the growth rate attained with the use of conventional organic compounds of Eversole by a still greater number of times. The invention makes possible this synthesis of diamond crystals with a lower equilibrium concentration of defects; it allows diamond to be grown unlimitedly even if the surface of the seed crystal is not atomically pure. At temperatures of about 1300° K., the side deposition of graphite is very small, indeed, it is much smaller than in the method of W. G. Eversole. At temperatures below 1200° K., graphite practically does not form at all.

The present invention is further illustrated by the following examples.

EXAMPLE I

A 51.20 mg. sample of 0–1 micron grade diamond powder was placed into a silica tube and then into a silica reactor. One end of the reactor was connected to an evaporator containing tetraethyl lead, and the other end of the reactor was connected to a high-vacuum evacuation system. By evacuation to a vacuum of $2 \times 10^{-5}$ mm. mercury, traces of air were removed from the reactor and a small amount of tetraethyl lead vapours from the evaporator. Then the evaporator was cooled down to 77° K., and with the help of an outside furnace the sample of diamond powder was heated in a vacuum to 1253° K. Simultaneously the evaporator was heated to 296° K. and tetraethyl lead vapours coming from the evaporator at a rate of 0.7 g./hr. were decomposed on the diamond seed crystals.

Lead deposited on cold portions of the silica reactor, and hydrogen was evacuated by the vacuum system. The non-decomposed lead compound and other by-products of the reaction were frozen out at a temperature of 77° K. in a trap arranged in front of the high-vacuum evacuation system. The total gain in weight of the silica tube with the diamond powder was 2.50 mg. as determined by weighing on an analytical balance with an accuracy of ±0.02 mg. Small admixtures of graphite in the diamond powder were removed by heating in hydrogen at a temperature of 1273° K. and pressure of 54 atm. during ½ hr. The deposited diamond powder could not be differentiated from the initial white diamond powder, and weighing showed a gain in weight of 1.80 mg., or 2.3 wt. percent per hour.

EXAMPLE 2

The process of synthesis of diamond was carried out as described in Example I, but tetramethyl lead was taken as the initial organometal compound. The growth rate of diamond on seed crystals weighing 50 mg. was 2.1 wt. percent per hour.

EXAMPLE 3

The process of synthesis of diamond was carried out as described in Example I, but dimethyl mercury was used as the initial organometal compound. The growth rate of diamond on seed diamond powder weighing 50 mg. was 1.7 wt. percent per hour.

EXAMPLE 4

The process of synthesis of diamond was carried out as described in Example I, the difference being in that dimethyl mercury was used as the organometal compound and the process was carried out at a temperature of 703° K. The growth rate of diamond on seed material weighing 200 mg. was 0.8 wt. percent per hour.

Samples of deposited diamond powder in the above-cited examples are white in color and are similar to the initial diamond powder. X-ray structure analysis revealed no graphite in the deposited diamond powder. The results of elementary analysis have shown the content of carbon in the initial diamond powder to be 96.17 wt. percent, and in the deposited diamond powder 96.28 wt. percent, the rest being mineral admixtures which were present in the samples.

What is claimed is:

1. A process of synthesizing diamonds, comprising contacting diamond seed crystals with the gaseous phase of an organometal compound selected from the group comprising methyl and ethyl derivatives of lead and mercury, said contacting being effected within the temperature range of 700° K. to 1200° K. at a pressure of $10^{-6}$ to $10^{-2}$ bar.

2. A process as claimed in claim 1, wherein tetraethyl lead is used as the organometal compound.

3. A process as claimed in claim 1, wherein tetramethyl lead is used as an organometal compound.

4. A process as claimed in claim 1, wherein dimethyl mercury is used as the organometal compound.

References Cited

UNITED STATES PATENTS

| | | | |
|---|---|---|---|
| 3,030,187 | 4/1962 | Eversole | 23—209.1 D |
| 3,030,188 | 4/1962 | Eversole | 23—209.1 D |

OTHER REFERENCES

J. C. Angus et al., "Growth of Diamond Seed Crystals by Vapor Deposition," Journal of Applied Physics, vol. 39, No. 6, May 1968, pp. 2915–2922.

EDWARD J. MEROS, Primary Examiner

G. ALVARO, Assistant Examiner